(12) United States Patent
Ogawa et al.

(10) Patent No.: US 9,753,450 B2
(45) Date of Patent: Sep. 5, 2017

(54) TIME SERIES DATA DISPLAY DEVICE CONVERTING POINT SEQUENCE DATA TO TIME SERIES DATA REGARDING DRIVE AXES TO BE DISPLAYED

(71) Applicant: FANUC Corporation, Yamanashi (JP)

(72) Inventors: Hajime Ogawa, Yamanashi (JP);
Junichi Tezuka, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 149 days.

(21) Appl. No.: 14/876,863

(22) Filed: Oct. 7, 2015

(65) Prior Publication Data
US 2016/0109873 A1  Apr. 21, 2016

(30) Foreign Application Priority Data
Oct. 16, 2014 (JP) .................. 2014-211963

(51) Int. Cl.
*G05B 19/402* (2006.01)
*G05B 19/18* (2006.01)
*G05B 19/4062* (2006.01)
*G05B 19/401* (2006.01)

(52) U.S. Cl.
CPC .......... *G05B 19/402* (2013.01); *G05B 19/18* (2013.01); *G05B 19/401* (2013.01); *G05B 19/4062* (2013.01); *G05B 2219/39219* (2013.01)

(58) Field of Classification Search
CPC .... G05B 19/18; G05B 19/231; G05B 19/291; G05B 19/351; G05B 19/371; G05B 19/401; G05B 19/402; G05B 19/404; G05B 19/4062; G05B 2219/39219
See application file for complete search history.

(56) References Cited

U.S. PATENT DOCUMENTS

| | | | | |
|---|---|---|---|---|
| 2007/0046677 | A1* | 3/2007 | Hong ............. | G05B 19/41 345/442 |
| 2011/0015877 | A1* | 1/2011 | Okita ............. | G05B 19/409 702/41 |
| 2011/0057599 | A1* | 3/2011 | Iwashita ........ | G05B 19/4068 318/601 |

(Continued)

FOREIGN PATENT DOCUMENTS

| | | |
|---|---|---|
| CN | 102368156 A | 3/2012 |
| CN | 103186112 A | 7/2013 |

(Continued)

*Primary Examiner* — Dennis M Butler
(74) *Attorney, Agent, or Firm* — Hauptman Ham, LLP (57) ABSTRACT

A time series data display device calculates position data in time-series of a movement point on drive axes based on the position feedback data, generates a command movement trajectory of the machine end based on the position command data, generates an actual movement trajectory of the machine end based on the actual position data, calculates position data of the machine end which are intersection points between straight lines, which are perpendicular to the command movement trajectory and pass through the movement point, and the actual movement trajectory, converts the position data of the machine end to position data with respect to drive axes, and displays the position feedback data in time-series and the position data in time-series.

5 Claims, 5 Drawing Sheets

(56) References Cited

U.S. PATENT DOCUMENTS

| | | | | |
|---|---|---|---|---|
| 2013/0169208 A1* | 7/2013 | Tezuka | ............... | G05B 19/19 318/570 |
| 2016/0282846 A1* | 9/2016 | Nagaoka | ............... | B23Q 15/22 |
| 2016/0327932 A1* | 11/2016 | Shinohara | ............... | G05B 11/01 |

FOREIGN PATENT DOCUMENTS

| JP | 5-127729 A | 5/1993 |
|---|---|---|
| JP | 2000-56822 A | 2/2000 |
| JP | 2003-075472 A | 3/2003 |
| JP | 2012-69169 A | 4/2012 |
| JP | 2013-69231 A | 4/2013 |
| JP | 2013-250636 A | 12/2013 |

\* cited by examiner

TIME SERIES DATA DISPLAY DEVICE CONVERTING POINT SEQUENCE DATA TO TIME SERIES DATA REGARDING DRIVE AXES TO BE DISPLAYED

RELATED APPLICATIONS

The present application claims priority to Japanese Application Number 2014-211963, filed Oct. 16, 2014, the disclosure of which is hereby incorporated by reference herein in its entirety.

BACKGROUND OF THE INVENTION

1. Field of the Invention

The present invention relates to a time series data display device which converts point sequence data to time series data with respect to drive axes and displays the time series data.

2. Description of the Related Art

Conventionally, a device which displays waveforms of time series data of servo information acquired from a numerical control device in an identical display frame in a superposed manner has been known (refer to, for example, Japanese Laid-open Patent Publication No. 2003-75472). In the device disclosed in Japanese Laid-open Patent Publication No. 2003-75472, a waveform of a current servo information acquired from a numerical control device and a waveform of a past servo information acquired from the numerical control device are displayed in a superposed manner, in such a way as to make time axes thereof coincide with each other, and in an identical display frame.

In a machine tool controlled by a numerical control device, for example, the position of the machine end (tip portion of a tool or the like) and the position of drive axes which drive the machine end (position feedback data) are measured by separate measuring instruments. Thus, in order to make proper servo adjustments, it is preferable to convert point sequence data of the machine end (position data) to position data with respect to the drive axes and display the position data after conversion and the position feedback data of the drive axes in time series and in a comparable manner.

SUMMARY OF INVENTION

A time series data display device which is an aspect of the present invention includes a position feedback data acquisition unit which acquires position feedback data, which are position feedback data of drive axes driven by servo motors and obtained by first measuring instruments, with a predetermined sampling period. The time series data display device includes a command data acquisition unit which acquires position command data to a machine end, which moves driven by the drive axes, from a numerical control device. The time series data display device includes a position data acquisition unit which acquires actual position data of the machine end obtained by a second measuring instrument with a predetermined sampling period. The time series data display device includes a drive axis position calculation unit which, based on the position feedback data acquired by the position feedback data acquisition unit, calculates position data in time-series of a movement point on the drive axes. The time series data display device includes a command trajectory generation unit which, based on the position command data in time-series to the machine end acquired by the command data acquisition unit, generates a command movement trajectory of the machine end. The time series data display device includes an actual trajectory generation unit which, based on the actual position data in time-series of the machine end acquired by the position data acquisition unit, generates an actual movement trajectory of the machine end. The time series data display device includes a machine end position calculation unit which calculates position data of the machine end which are intersection points between straight lines, which are perpendicular to the command movement trajectory generated by the command trajectory generation unit and pass through the movement point expressed by the position data calculated by the drive axis position calculation unit, and the actual movement trajectory generated by the actual trajectory generation unit. The time series data display device includes a position data conversion unit which converts the position data of the machine end calculated by the machine end position calculation unit to the position data with respect to the drive axes. The time series data display device includes a display unit which displays the position feedback data in time-series acquired by the position feedback data acquisition unit and the position data in time-series converted by the position data conversion unit in the same display style as each other.

BRIEF DESCRIPTION OF THE DRAWINGS

The above-described objects, features, and effects of the present invention will be made much clearer from the following description of an embodiment related to the accompanying drawings. In the accompanying drawings.

DETAILED DESCRIPTION

Figure 1:
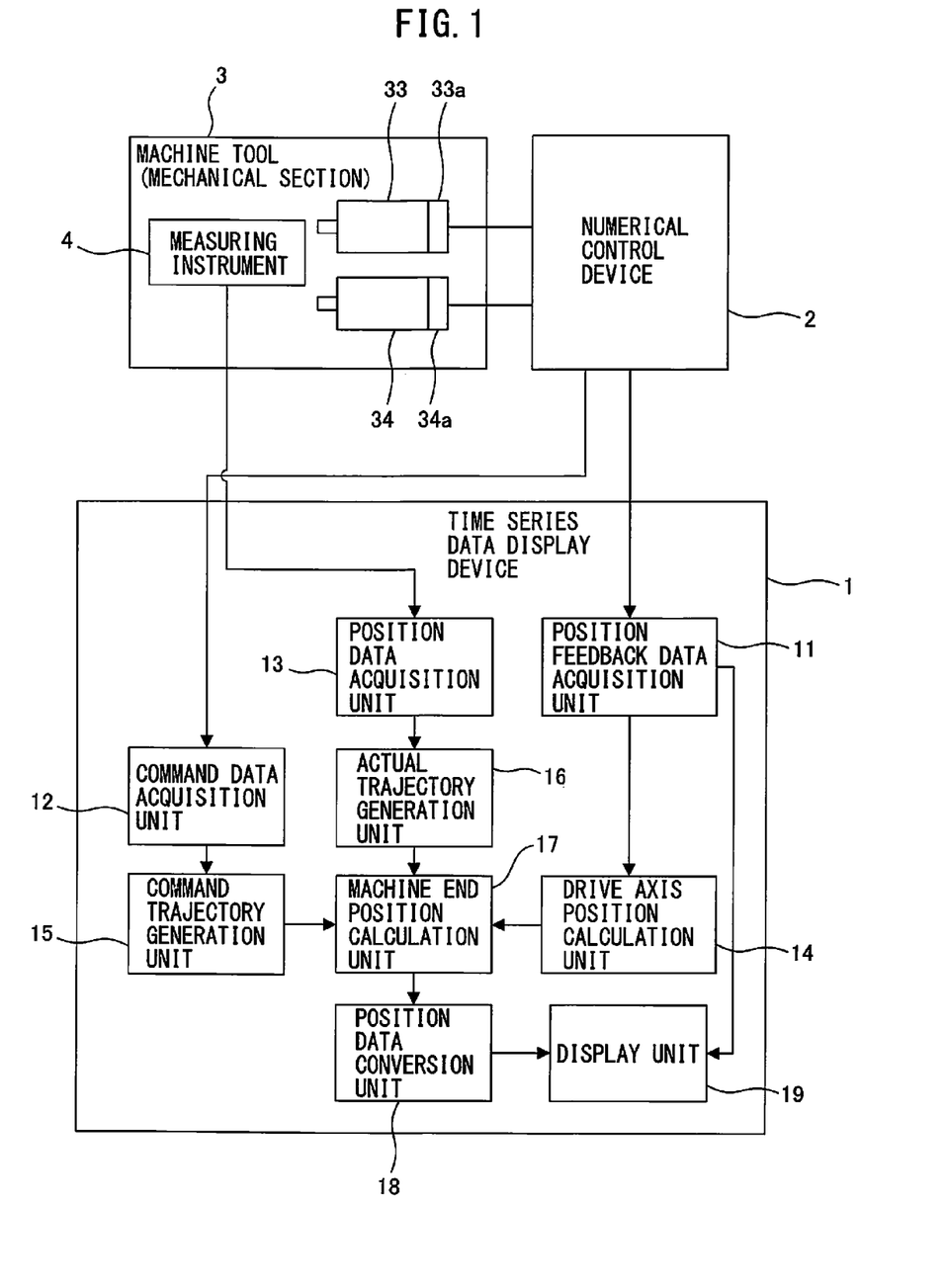
FIG. 1 is a block diagram illustrating an overall configuration of a time series data display device according to an embodiment of the present invention.
Figure 2:
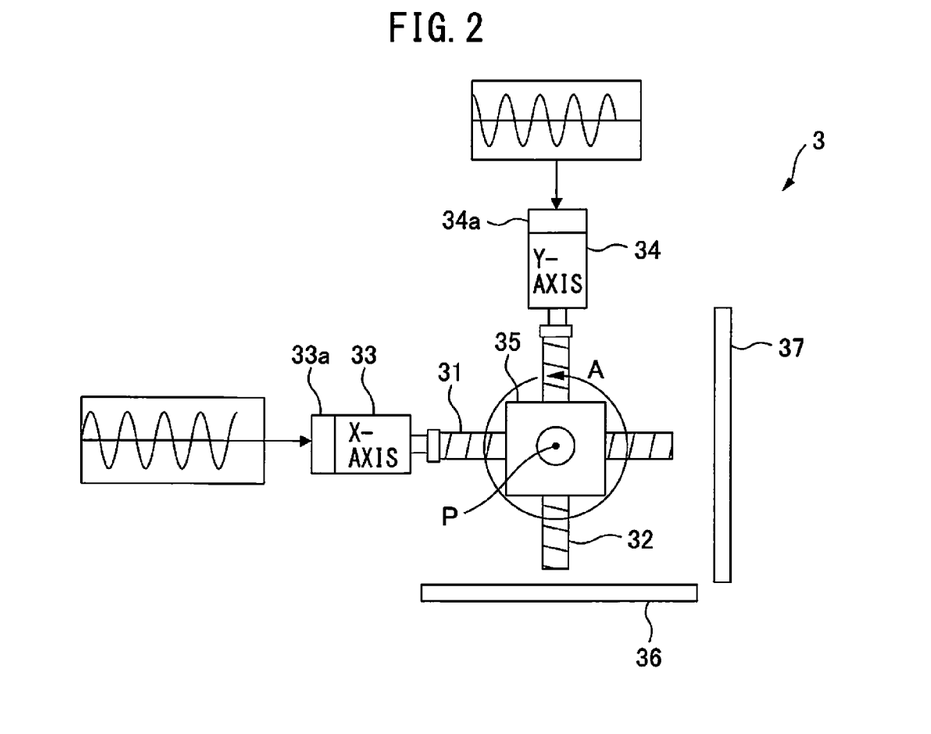
FIG. 2 is a plan view illustrating a configuration of a main portion of a machine tool to which the time series data display device according to the embodiment of the present invention is applied.

A time series data display device according to an embodiment of the present invention will be described below with reference to FIGS. 1 to 7. The time series data display device 1 according to the embodiment of the present invention is, for example, applied to a machine tool 3 which is controlled by a numerical control device 2. FIG. 1 is a block diagram illustrating an overall configuration of the time series data display device 1 according to the embodiment of the present invention. FIG. 2 is a plan view illustrating a configuration of a main portion of the machine tool 3.

As illustrated in FIG. 2, the machine tool 3 includes a ball screw 31 which extends along the x-axis direction, a ball screw 32 which extends along the y-axis direction, a servo motor 33 for the x-axis which rotates the ball screw 31, a servo motor 34 for the y-axis which rotates the ball screw 32, and a table 35 on which a not-illustrated workpiece is mounted. Each of the ball screws 31 and 32 is screwed to a not-illustrated nut, which is fixed to a bottom part of the table 35. With this configuration, when the servo motors 33 and 34 are driven, the nuts move along the ball screws 31 and 32. The table 35 moves in the x-y direction in accordance with the rotation amounts of the servo motors 33 and 34. Although illustration is omitted, a tool is arranged facing the table 35 above the table 35. While the tool moves relative to the table, the workpiece is machined.

The servo motors 33 and 34 have rotation amount detectors 33*a* and 34*a* (for example, rotary encoders) built-in, respectively. The rotation amount detectors 33*a* and 34*a* function as first measuring instruments. It is possible to detect the rotation amounts of the ball screws 31 and 32 (drive axes), i.e., the positions of the nuts, by the rotation amount detectors 33*a* and 34*a* with a predetermined sampling period $\Delta t1$. Scales 36 and 37 (linear scales) may be disposed facing the ball screws 31 and 32 in substitution for the rotation amount detectors 33*a* and 34*a*. In this case, the scales 36 and 37 function as the first measuring instruments. The scales 36 and 37 are capable of detecting the positions of the nuts on the drive axes. As illustrated in FIG. 1, the numerical control device 2 is connected to the servo motors 33 and 34, and the position data detected by the rotation amount detectors 33*a* and 34*a* are input to the numerical control device 2 as position feedback data.

The numerical control device 2 outputs control signals to the servo motors 33 and 34. More specifically, the numerical control device 2 outputs a movement command of a position command point P (machine end) on the table 35 to each of the servo motors 33 and 34 based on a pre-stored machining program, and performs feedback controls of the servo motors 33 and 34 in accordance with feedback signals from the rotation amount detectors 33*a* and 34*a*. The position command point P is, for example, the center point of the table 35 as illustrated in FIG. 2, and position command data in time-series with respect to the respective drive axes, which include coordinate values of the position command point P, are stored in the machining program in a predetermined format (G-code or the like).

Figure 3:
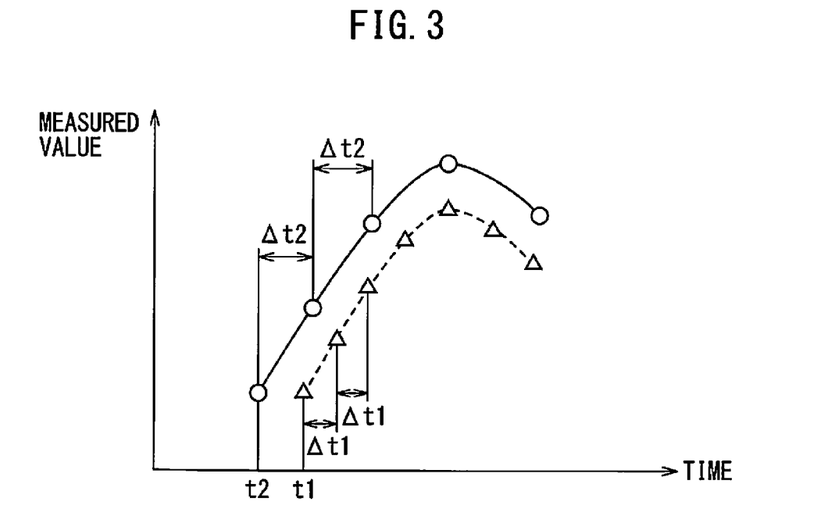
FIG. 3 is a diagram illustrating a relation between an actual position data and a position feedback data.

The position commands output to the respective servo motors 33 and 34 are, for example, given as waveform data as illustrated in FIG. 3. With this feature, the table 35 repeats a circular motion as illustrated by an arrow A in FIG. 2, and the position command point P moves along a circle. Although the center point of the table 35 is set as the position command point P in FIG. 2, the position of the tool (for example, the tip portion of the tool) may be set as the position command point P.

As illustrated in FIG. 1, a measuring instrument 4 is disposed facing the table 35 on the machine tool 3. The measuring instrument 4 functions as a second measuring instrument. The position of the position command point P is measured by the measuring instrument 4. A cross-grid scale, a ball bar, or the like may be used as the measuring instrument 4. For example, in a case of using a ball bar, after the start of the machining program, position measurement is started when the ball bar is pushed in, and, thereafter, the position measurement is repeated with a predetermined sampling period $\Delta t2$. With this feature, the coordinate data (actual position data) of the position command point P is acquired in time series. The position data measured by the measuring instrument 4 may be decomposed into components with respect to the respective drive axes (the x-axis component and the y-axis component, or the like).

FIG. 3 is a diagram illustrating the x-axis component of the actual position data in time-series acquired by the measuring instrument 4 and the x-axis component of the position feedback data in time-series acquired by the rotation amount detector 33*a*. Circles in FIG. 3 indicate the actual position data and triangles indicate the position feedback data. The actual position data and the position feedback data change sinusoidally in accordance with the position command data as illustrated by a solid line and a dotted line, respectively.

The position feedback data and the actual position data are acquired by measuring instruments which are different from each other. Thus, as illustrated in FIG. 3, a measurement start time t1 of the position feedback data and a measurement start time t2 of the actual position data and the sampling period $\Delta t1$ of the position feedback data and the sampling period $\Delta t2$ of the actual position data are different from each other, respectively. Therefore, comparison between the position feedback data and the actual position data is difficult, which makes it difficult to make proper servo adjustments of the servo motors 33 and 34. Accordingly, in the embodiment, the time series data display device 1 is configured in the following way so as to display these series of data in a comparable manner.

The time series data display device 1 is configured by including an arithmetic processing unit which has a CPU (Central Processing Unit), a ROM (Read Only Memory), a RAM (Random Access Memory), other peripheral circuits, and the like. As illustrated in FIG. 1, the time series data display device 1 includes, as a functional configuration, a position feedback data acquisition unit 11, a command data acquisition unit 12, a position data acquisition unit 13, a drive axis position calculation unit 14, a command trajectory generation unit 15, an actual trajectory generation unit 16, a machine end position calculation unit 17, a position data conversion unit 18, and a display unit 19.

Figure 4:
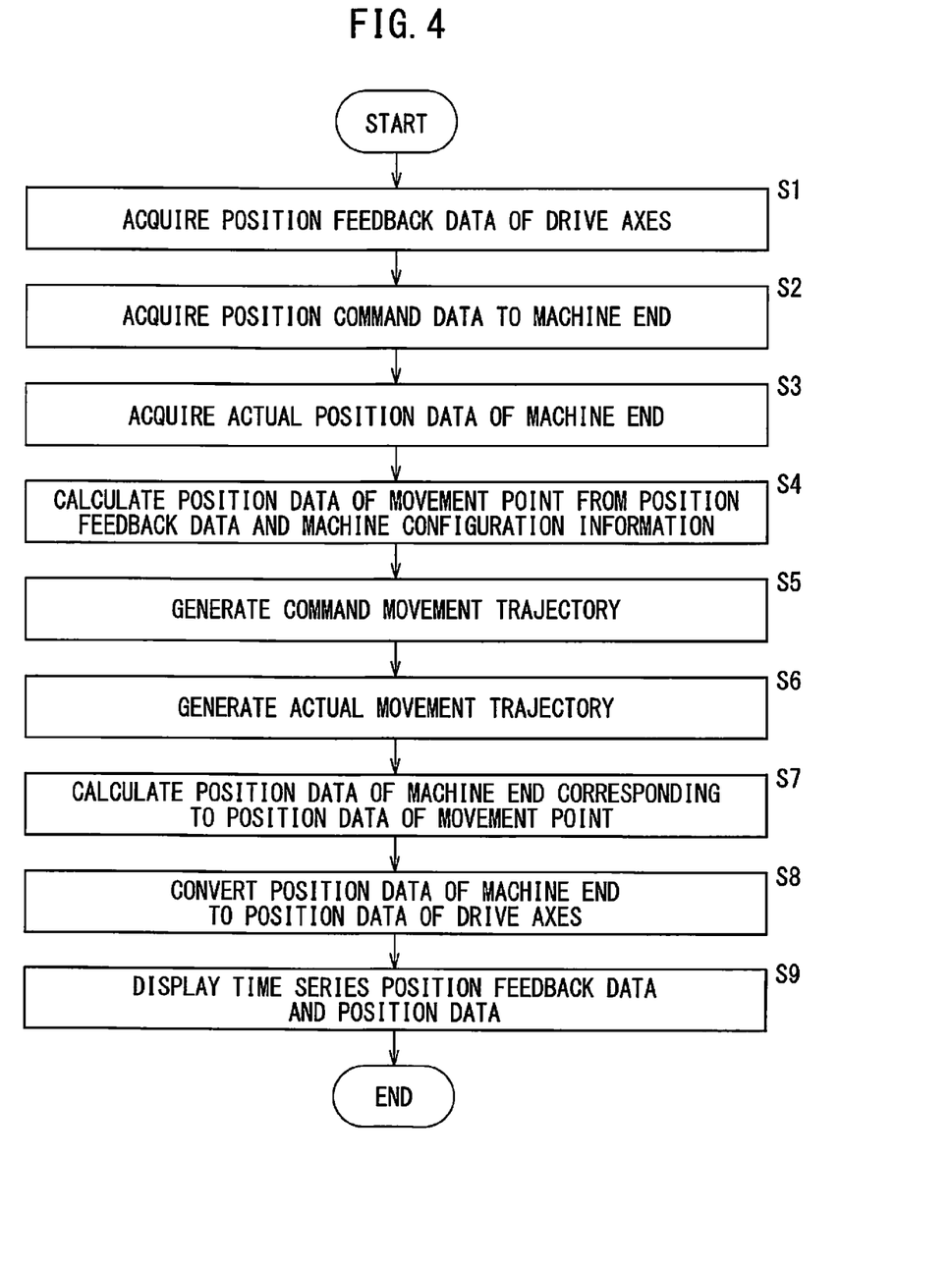
FIG. 4 is a flowchart illustrating an example of processing carried out by the time series data display device in FIG. 1.

FIG. 4 is a flowchart illustrating an example of processing carried out by the time series data display device 1. By using this flowchart, configurations of the respective components of the time series data display device 1 will be described. In the following description, as illustrated in FIG. 2, it is assumed that the numerical control device 2 outputs sinusoidal position commands with phases differing from each other by 90° to the servo motor 33 for the x-axis and the servo motor 34 for the y-axis, respectively, in accordance with the machining program to make the position command point P move in a circular shape.

In step S1, the position feedback data acquisition unit 11 acquires the position feedback data in time-series, i.e., the position feedback data at every predetermined sampling period $\Delta t1$, obtained by the rotation amount detectors 33*a* and 34*a* via the numerical control device 2. When the scales 36 and 37 for position feedback use are disposed in substitution for the rotation amount detectors 33*a* and 34*a*, the position feedback data acquisition unit 11 acquires the position feedback data in time-series obtained by the scales 36 and 37 via the numerical control device 2.

In step S2, the command data acquisition unit 12 acquires the position command data in time-series (position command coordinate values) to the position command point P (machine end) from the numerical control device 2. The position command data are acquired with the same period $\Delta t1$ as the position feedback data. A k-th position command data is a piece of data at $k \cdot \Delta t1$ seconds after the measurement start and denoted by $(PcXk(k \cdot \Delta t1), PcYk(k \cdot \Delta t1))$.

When the numerical control device 2 outputs position commands to the respective drive axes (the x-axis and the y-axis), instead of a position command to the machine end, the command data acquisition unit 12 acquires the position command data to the respective drive axes from the numerical control device 2. The command data acquisition unit 12 acquires the position command data to the machine end based on the position command data to the drive axes and machine configuration information. The machine configuration information includes information on the origin of a workpiece coordinate system, a movement amount of the table 35 per rotation of the servo motors 33 and 34, an axial configuration, and the like, which have been stored in the numerical control device 2 or the time series data display device 1 in advance.

In step S3, the position data acquisition unit 13 acquires position data in time-series (actual position data) of the position command point P measured by the measuring instrument 4, i.e., actual position data which are point sequence data at every predetermined sampling period $\Delta t2$. A k-th actual position data is denoted by (PmXk(k·$\Delta t2$), PmYk(k·$\Delta t2$)).

In step S4, the drive axis position calculation unit 14 calculates position data in time-series of a point on the drive axes (movement point) corresponding to the machine end based on the position feedback data acquired in step S1 and the pre-stored machine configuration information. The movement point is, for example, equivalent to a position of the position command point P on the table 35. The position data of the movement point are calculated with a period $\Delta t1$, which is the same as the period for the measurement of the position feedback data, and denoted by (PfXk(k·$\Delta t1$), PfYk(k·$\Delta t1$)). When the scales 36 and 37 are disposed in substitution for the rotation amount detectors 33a and 34a, it is also possible to calculate the position data in time-series of the movement point directly from the position feedback data without using the machine configuration information.

Figure 5:
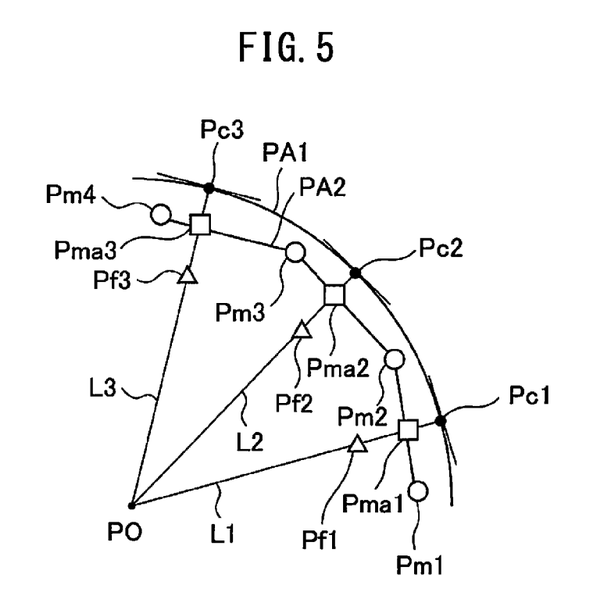
FIG. 5 is a diagram describing an operation by the time series data display device in FIG. 1.

In step S5, the command trajectory generation unit 15 generates a movement trajectory of the position command point P (machine end), i.e., a command movement trajectory, based on the position command data in time-series acquired in step S2. FIG. 5 is a diagram illustrating an example of a command movement trajectory PA1 in the x-y plane. In the embodiment, since the position command is output from the numerical control device 2 so that the table 35 makes a circular motion, the command movement trajectory PA1 becomes a circle with the center at the origin P0. In FIG. 5, the first position, the second position, and the third position of the position command point P are denoted by Pc1, Pc2, and Pc3, respectively.

In step S6, the actual trajectory generation unit 16 generates a movement trajectory of the machine end, i.e. an actual movement trajectory PA2, based on the actual position data in time-series of the machine end acquired in step S3. Pm1, Pm2, Pm3, and Pm4 in FIG. 5 denote the first, the second, the third, and the fourth actual position data, respectively. Coordinates (PmX, PmY) of the actual movement trajectory PA2 are calculated by interpolating values between adjacent actual position data, i.e., between a (k−1)-th actual position data (PmX$_{k-1}$, PmY$_{k-1}$) and a k-th actual position data (PmX$_k$, PmY$_k$), with a linear approximation line expressed by, for example, the following formula (I).

$$PmY = \frac{PmY_{k-1} - PmY_k}{PmX_{k-1} - PmX_k}(PmX - PmX_k) + PmY_k \qquad (I)$$

In step S7, the machine end position calculation unit 17 calculates straight lines which are perpendicular to the command movement trajectory PA1, which is calculated in step S5, and pass through the movement point expressed by the position data calculated in step S4. Pf1, Pf2, and Pf3 in FIG. 5 denote the first, the second, and the third positions of the movement point, which are expressed by the position data calculated in step S4, respectively. In step S7, the machine end position calculation unit 17 first calculates straight lines L1, L2, and L3, which pass through the respective positions of the movement point Pf1, Pf2, and Pf3 and are perpendicular to the command movement trajectory.

Next, the machine end position calculation unit 17 calculates coordinates of intersection points Pma1, Pma2, and Pma3 between the straight lines L1, L2, and L3 and the actual movement trajectory PA2 generated in step S6, i.e., the position data of the machine end. The calculated position data are position data at the same times as the positions of the movement point Pf1, Pf2, and Pf3, which are acquired from the position feedback data, and correspond to the position data of the movement point. Thus, the first position data is a piece of data at the measurement start time t1 of the measurement by the rotation amount detectors 33a and 34a (refer to FIG. 3). The k-th position data of the machine end is denoted by (PmaXk(k·$\Delta t1$), PmaYk(k·$\Delta t1$)) by use of a sampling period $\Delta t1$, which is the same as the sampling period for the position feedback.

In step S8, the position data conversion unit 18 converts the position data (PmaXk(k·$\Delta t1$), PmaYk(k·$\Delta t1$)) of the machine end, which are calculated in step S7, to position data with respect to the respective drive axes (the x-axis and the y-axis) by using the machine configuration information. In the embodiment, since the machine configuration is a configuration which has two orthogonal axes of the x-axis and the y-axis, and the machine end (position command point P) moves along a circle, the position data with respect to the x-axis are PmaXk(k·$\Delta t1$) and the position data with respect to the y-axis are PmaYk(k·$\Delta t1$).

Figure 6:
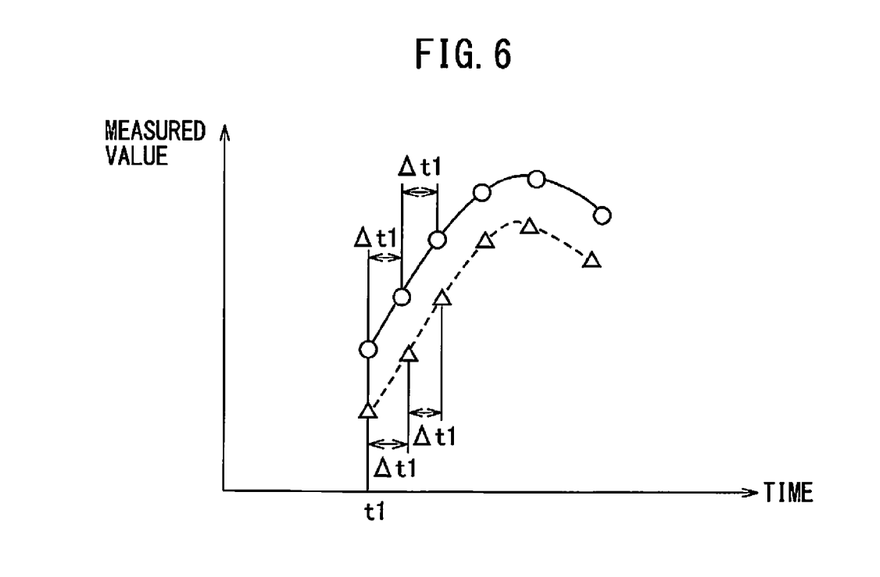
FIG. 6 is a diagram illustrating an example of a display screen displayed by processing of a display unit in FIG. 1.

In step S9, the display unit 19 displays the position feedback data in time-series of the respective drive axes, which are acquired in step S1, and the position data in time-series with respect to the respective drive axes, which are calculated in the conversion in step S8, in the same display style as each other on a monitor. FIG. 6 is a diagram illustrating an example of a display screen displayed on the monitor. In this figure, for example, the position feedback data of the x-axis are indicated by triangles and the position data with respect to the x-axis, which are calculated in step S8, are indicated by circles. As illustrated in FIG. 6, the measurement start time and the sampling period of the calculated position data are t1 and $\Delta t1$, respectively, and, thus, the position feedback data and the position data are displayed as data at the same time as each other on an identical graph in time series and in a superposed manner.

With this feature, it is possible to evaluate an effect of adjustment of parameters, such as a time constant, gain, or the like, of a servo motor on the machine end with respect to each drive axis, making it possible to make proper servo adjustments of the motor. In other words, it is possible to estimate whether a gap between the position feedback data and the position data is caused by parameter settings or transfer characteristics of mechanical sections, such as a motor, a ball screw, a nut, etc. For example, when the gap between the position feedback data and the position data is not eliminated even if parameters are changed, it is possible to estimate that the transfer characteristics of the mechanical sections have caused the gap.

As described above, the time series data display device 1 according to the embodiment includes the position feedback data acquisition unit 11 which acquires the position feedback data, which are position feedback data of the drive axes driven by the servo motors 33 and 34 and obtained by the rotation amount detectors 33a and 34a or the scales 36 and 37, with a sampling period Δt1. The time series data display device 1 includes the command data acquisition unit 12 which acquires the position command data to the machine end (position command point P), which moves driven by the drive axes, from the numerical control device 2. The time series data display device 1 includes the position data acquisition unit 13 which acquires actual position data of the machine end, which are obtained by the measuring instrument 4, with a sampling period Δt2. The time series data display device 1 includes the drive axis position calculation unit 14 which, based on the position feedback data acquired by the position feedback data acquisition unit 11, calculates the position data in time-series of the movement point on the drive axes. The time series data display device 1 includes the command trajectory generation unit 15 which, based on the position command data in time-series to the machine end acquired by the command data acquisition unit 12, generates the command movement trajectory PA1 of the machine end. The time series data display device 1 includes the actual trajectory generation unit 16 which, based on the actual position data in time-series of machine end acquired by the position data acquisition unit 13, generates the actual movement trajectory PA2 of the machine end. The time series data display device 1 includes the machine end position calculation unit 17 which calculates the position data of the machine end which are intersection points between the straight lines L1 to L3, which are perpendicular to the command movement trajectory PA1 generated by the command trajectory generation unit 15 and pass through the movement point expressed by the position data calculated by the drive axis position calculation unit 14, and the actual movement trajectory PA2 generated by the actual trajectory generation unit 16. The time series data display device 1 includes the position data conversion unit 18 which converts the position data of the machine end calculated by the machine end position calculation unit 17 to the position data with respect to the drive axes. The time series data display device 1 includes the display unit 19 which displays the position feedback data in time-series acquired by the position feedback data acquisition unit 11 and the position data in time-series converted by the position data conversion unit 18 in the same display style as each other. With this configuration, it is possible to display the position data of the machine end with respect to the respective drive axes and the position feedback data of the respective drive axes in time series and in a comparable manner, making it possible to make servo adjustments properly.

Although, in the above-described embodiment, the position feedback data in time-series acquired by the position feedback data acquisition unit 11 and the position data in time-series converted by the position data conversion unit 18 are displayed on the monitor in a comparable manner by processing in the display unit 19, the position command data in time-series acquired by the command data acquisition unit 12 may also be displayed on the monitor at the same time.

Figure 7:
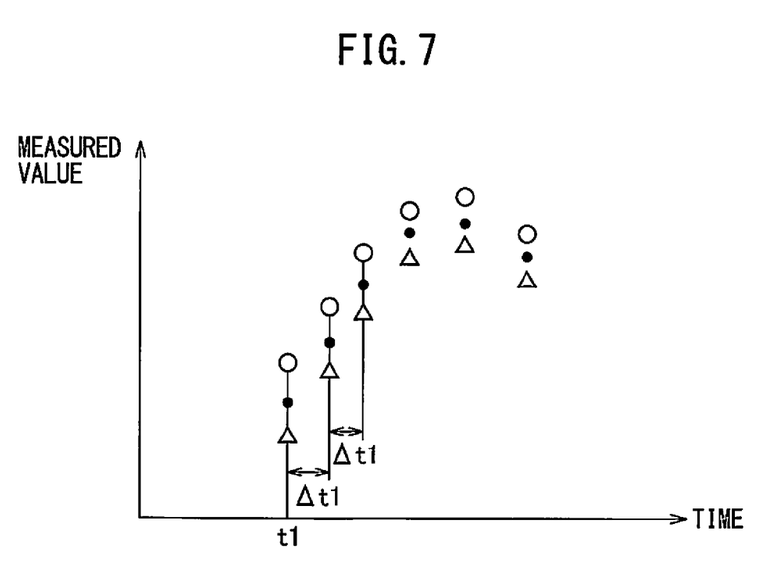
FIG. 7 is a diagram illustrating a variation of the display screen in FIG. 6.

FIG. 7 is a diagram illustrating an example of the above-described variation of the embodiment. In this figure, the position feedback data of the x-axis are illustrated by triangles, and the position data with respect to the x-axis calculated in step S8 are illustrated by circles. The position command data are illustrated by black dots. With this feature, it is possible to compare the position data with the position command data at the same times, and it is also possible to make servo adjustments properly so that the position data coincide with the position command data. As a result, it is possible to achieve an improvement in accuracy in machining a workpiece.

In acquiring the position command data to the machine end from the numerical control device 2 (step S2), the command data acquisition unit 12 may acquire the position command data to the respective drive axes from the numerical control device 2, calculate the position command data to the machine end based on the position command data to the respective drive axes and the machine configuration information, and thereby acquire the position command data. In other words, the command data acquisition unit 12 is also able to calculate the position command data to the machine end by using the position command data to the respective drive axes instead of acquiring the position command data to the machine end directly from the numerical control device 2.

Although, in the above-described embodiment, the actual movement trajectory is generated by interpolating values between the actual position data in time-series of the machine end with straight lines (formula (I)) by processing in the actual trajectory generation unit 16, the actual movement trajectory may also be generated by interpolating values between the position data in time-series of the machine end by using polynomials. For the polynomial in this case, for example, the following formula (II) may be used.

$$Y = Y_0 \frac{(X - X_1)(X - X_2)}{(X_0 - X_1)(X_0 - X_2)} + \qquad (II)$$
$$Y_1 \frac{(X - X_0)(X - X_2)}{(X_1 - X_0)(X_1 - X_2)} + Y_2 \frac{(X - X_0)(X - X_1)}{(X_2 - X_0)(X_2 - X_1)} =$$
$$\left( \frac{Y_0}{(X_0 - X_1)(X_0 - X_2)} + \frac{Y_1}{(X_1 - X_0)(X_1 - X_2)} + \right.$$
$$\left. \frac{Y_2}{(X_2 - X_0)(X_2 - X_1)} \right) \times X^2 +$$
$$2 \times \left( \frac{Y_0}{(X_0 - X_1)(X_0 - X_2)} + \frac{Y_1}{(X_1 - X_0)(X_1 - X_2)} + \right.$$
$$\left. \frac{Y_2}{(X_2 - X_0)(X_2 - X_1)} \right) \times (X_0 + X_1 + X_2) \times X +$$
$$\left( \frac{Y_0}{(X_0 - X_1)(X_0 - X_2)} + \frac{Y_1}{(X_1 - X_0)(X_1 - X_2)} + \right.$$
$$\left. \frac{Y_2}{(X_2 - X_0)(X_2 - X_1)} \right) \times (X_1 X_2 + X_0 X_2 + X_0 X_1)$$

Although, in the above-described embodiment, the position feedback data are acquired by the rotation amount detectors 33a and 34a or the scales 36 and 37, the configuration of the first measuring instrument is not limited to the configuration. Although, in the above-described embodiment, the actual position data of the machine end are acquired by the measuring instrument 4, the configuration of the second measuring instrument is also not limited to the configuration. The present invention may also be applied to any machine tool other than the above-described machine tool in the same manner if the machine tool is a machine tool which has a servo motor controlled by a numerical control device.

With the present invention, since the position data of the machine end with respect to the drive axes and the position feedback data of the drive axes are displayed in a comparable manner, it is possible to make servo adjustments easily and properly.

The above description is only an example, and the above-described embodiment and variations thereof do not limit the present invention unless the characteristics of the present invention are impaired. Components which are replaceable and obvious to be replaced while maintaining identity of the invention are included as components of the above-described embodiment and variations thereof. In other words, other embodiments which are conceivable within the technical scope of the present invention are also within the scope of the present invention. Further, one or a plurality of the above-described embodiment and variations thereof may be arbitrarily combined.

The invention claimed is:

1. A time series data display device, comprising:
- a position feedback data acquisition unit which acquires position feedback data, which are position feedback data of drive axes driven by servo motors and obtained by first measuring instruments, with a predetermined sampling period;
- a command data acquisition unit which acquires position command data to a machine end, which moves driven by the drive axes, from a numerical control device;
- a position data acquisition unit which acquires actual position data of the machine end, which are obtained by a second measuring instrument, with a predetermined sampling period;
- a drive axis position calculation unit which, based on the position feedback data acquired by the position feedback data acquisition unit, calculates position data in time-series of a movement point on the drive axes;
- a command trajectory generation unit which, based on the position command data in time-series to the machine end acquired by the command data acquisition unit, generates a command movement trajectory of the machine end;
- an actual trajectory generation unit which, based on the actual position data in time-series of the machine end acquired by the position data acquisition unit, generates an actual movement trajectory of the machine end;
- a machine end position calculation unit which calculates position data of the machine end which are intersection points between straight lines, which are perpendicular to the command movement trajectory generated by the command trajectory generation unit and pass through the movement point expressed by the position data calculated by the drive axis position calculation unit, and the actual movement trajectory generated by the actual trajectory generation unit;
- a position data conversion unit which converts the position data of the machine end calculated by the machine end position calculation unit to position data with respect to the drive axes; and
- a display unit which displays the position feedback data in time-series acquired by the position feedback data acquisition unit and the position data in time-series converted by the position data conversion unit in the same display style as each other.

2. The time series data display device according to claim 1,
wherein the display unit, in addition to the position feedback data and the position data, displays the position command data in time-series acquired by the command data acquisition unit at the same time.

3. The time series data display device according to claim 1,
wherein the command data acquisition unit acquires position command data to the drive axes from the numerical control device and, based on the position command data to the drive axes and machine configuration information, acquires the position command data to the machine end.

4. The time series data display device according to claim 1,
wherein the actual trajectory generation unit generates the actual movement trajectory by interpolating values between actual position data in time-series of the machine end with straight lines.

5. The time series data display device according to claim 1,
wherein the actual trajectory generation unit generates the actual movement trajectory by interpolating values between actual position data in time-series of the machine end with polynomials.

* * * * *